(12) United States Patent
Tupman et al.

(10) Patent No.: US 7,589,629 B2
(45) Date of Patent: Sep. 15, 2009

(54) EVENT RECORDER FOR PORTABLE MEDIA DEVICE

(75) Inventors: David Tupman, San Francisco, CA (US); Anthony Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 378 days.

(21) Appl. No.: 11/680,580

(22) Filed: Feb. 28, 2007

(65) Prior Publication Data

US 2008/0204218 A1   Aug. 28, 2008

(51) Int. Cl.
*G08B 1/08* (2006.01)
(52) U.S. Cl. .............. 340/539.11; 340/539.26; 340/517
(58) Field of Classification Search .............. 340/539.1, 340/539.11, 539.26, 539.27, 539.28, 539.29, 340/500, 501, 517, 10.41; 473/131, 212; 702/160
See application file for complete search history.

(56) References Cited

U.S. PATENT DOCUMENTS

| | | | |
|---|---|---|---|
| 4,090,216 A | 5/1978 | Constable | |
| 4,386,345 A | 5/1983 | Narveson et al. | |
| 4,451,849 A | 5/1984 | Fuhrer | |
| 4,589,022 A | 5/1986 | Prince et al. | |
| 4,908,523 A | 3/1990 | Snowden et al. | |
| 4,928,307 A | 5/1990 | Lynn | |
| 4,951,171 A | 8/1990 | Tran et al. | |
| 5,185,906 A | 2/1993 | Brooks | |
| 5,293,494 A | 3/1994 | Saito et al. | |
| 5,406,305 A | 4/1995 | Shimomura et al. | |
| 5,559,945 A | 9/1996 | Beaudet et al. | |
| 5,566,337 A | 10/1996 | Szymanski et al. | |
| 5,583,993 A | 12/1996 | Foster et al. | |
| 5,608,698 A | 3/1997 | Yamanoi et al. | |
| 5,616,876 A | 4/1997 | Cluts | |
| 5,617,386 A | 4/1997 | Choi | |
| 5,670,985 A | 9/1997 | Cappels, Sr. et al. | |
| 5,684,513 A | 11/1997 | Decker | |
| 5,710,922 A | 1/1998 | Alley et al. | |
| 5,712,949 A | 1/1998 | Kato et al. | |
| 5,721,949 A | 2/1998 | Smith et al. | |
| 5,726,672 A | 3/1998 | Hernandez et al. | |
| 5,739,451 A | 4/1998 | Winksy et al. | |
| 5,740,143 A | 4/1998 | Suetomi | |
| 5,760,588 A | 6/1998 | Bailey | |
| 5,778,374 A | 7/1998 | Dang et al. | |

(Continued)

FOREIGN PATENT DOCUMENTS

DE    43 34 773 A1    4/1994

(Continued)

OTHER PUBLICATIONS

"Apple Announces iTunes 2," Press Release, Apple Computer, Inc., Oct. 23, 2001.

(Continued)

*Primary Examiner*—Van T. Trieu
(74) *Attorney, Agent, or Firm*—Beyer Law Group LLP

(57) ABSTRACT

Operational parametric sensing and event recording capabilities are provided for portable electronic devices such as media players, cell phones, laptop computers, and the like that takes the can take the form of a standalone sensing unit or as an integrated component of the portable electronic device.

43 Claims, 8 Drawing Sheets

U.S. PATENT DOCUMENTS

| | | |
|---|---|---|
| 5,803,786 A | 9/1998 | McCormick |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,838,969 A | 11/1998 | Jacklin et al. |
| 5,864,868 A | 1/1999 | Contois |
| 5,867,163 A | 2/1999 | Kurtenbach |
| 5,870,710 A | 2/1999 | Ozawa et al. |
| 5,918,303 A | 6/1999 | Yamaura et al. |
| 5,920,728 A | 7/1999 | Hallowell et al. |
| 5,923,757 A | 7/1999 | Hocker et al. |
| 5,952,992 A | 9/1999 | Helms |
| 6,006,274 A | 12/1999 | Hawkins et al. |
| 6,009,237 A | 12/1999 | Hirabayashi et al. |
| 6,011,585 A | 1/2000 | Anderson |
| 6,018,705 A | 1/2000 | Gaudet et al. |
| 6,041,023 A | 3/2000 | Lakhansingh |
| 6,052,654 A | 4/2000 | Gaudet et al. |
| 6,108,426 A | 8/2000 | Stortz |
| 6,122,340 A | 9/2000 | Darley et al. |
| 6,158,019 A | 12/2000 | Squibb |
| 6,161,944 A | 12/2000 | Leman |
| 6,172,948 B1 | 1/2001 | Keller et al. |
| 6,179,432 B1 | 1/2001 | Zhang et al. |
| 6,185,163 B1 | 2/2001 | Bickford et al. |
| 6,191,939 B1 | 2/2001 | Burnett |
| 6,208,044 B1 | 3/2001 | Viswanadham et al. |
| 6,216,131 B1 | 4/2001 | Liu et al. |
| 6,217,183 B1 | 4/2001 | Shipman |
| 6,248,946 B1 | 6/2001 | Dwek |
| 6,295,541 B1 | 9/2001 | Bodnar et al. |
| 6,298,314 B1 | 10/2001 | Blackadar et al. |
| 6,332,175 B1 | 12/2001 | Birrell et al. |
| 6,336,365 B1 | 1/2002 | Blackadar et al. |
| 6,336,727 B1 | 1/2002 | Kim |
| 6,341,316 B1 | 1/2002 | Kloba et al. |
| 6,357,147 B1 | 3/2002 | Darley et al. |
| 6,377,530 B1 | 4/2002 | Burrows |
| 6,452,610 B1 | 9/2002 | Reinhardt et al. |
| 6,467,924 B2 | 10/2002 | Shipman |
| 6,493,652 B1 | 12/2002 | Ohlenbusch et al. |
| 6,536,139 B2 | 3/2003 | Darley et al. |
| 6,549,497 B2 | 4/2003 | Miyamoto et al. |
| 6,560,903 B1 | 5/2003 | Darley |
| 6,587,403 B1 | 7/2003 | Keller et al. |
| 6,587,404 B1 | 7/2003 | Keller et al. |
| 6,605,038 B1 | 8/2003 | Teller et al. |
| 6,606,281 B2 | 8/2003 | Cowgill et al. |
| 6,611,789 B1 | 8/2003 | Darley |
| 6,617,963 B1 * | 9/2003 | Watters et al. ............ 340/10.41 |
| 6,621,768 B1 | 9/2003 | Keller et al. |
| 6,623,427 B2 | 9/2003 | Mandigo |
| 6,631,101 B1 | 10/2003 | Chan et al. |
| 6,693,612 B1 | 2/2004 | Matsumoto et al. |
| 6,731,312 B2 | 5/2004 | Robbin |
| 6,760,536 B1 | 7/2004 | Amir et al. |
| 6,762,741 B2 | 7/2004 | Weindorf |
| 6,794,566 B2 | 9/2004 | Pachet |
| 6,799,226 B1 | 9/2004 | Robbin et al. |
| 6,801,964 B1 | 10/2004 | Mahdavi |
| 6,870,529 B1 | 3/2005 | Davis |
| 6,871,063 B1 | 3/2005 | Schiffer |
| 6,876,947 B1 | 4/2005 | Darley et al. |
| 6,882,955 B1 | 4/2005 | Ohlenbusch et al. |
| 6,898,550 B1 | 5/2005 | Blackadar et al. |
| 6,911,971 B2 | 6/2005 | Suzuki et al. |
| 6,918,677 B2 | 7/2005 | Shipman |
| 6,934,812 B1 | 8/2005 | Robbin et al. |
| 6,950,087 B2 | 9/2005 | Knox et al. |
| 7,028,096 B1 | 4/2006 | Lee |
| 7,046,230 B2 | 5/2006 | Zadesky |
| 7,062,225 B2 | 6/2006 | White |
| 7,084,856 B2 | 8/2006 | Huppi |
| 7,084,921 B1 | 8/2006 | Ogawa |
| 7,092,946 B2 | 8/2006 | Bodnar |
| 7,124,125 B2 | 10/2006 | Cook et al. |
| 7,143,241 B2 | 11/2006 | Hull |
| 7,146,437 B2 | 12/2006 | Robbin et al. |
| 7,171,331 B2 * | 1/2007 | Vock et al. .................. 702/160 |
| 7,191,244 B2 | 3/2007 | Jennings et al. |
| 7,213,228 B2 | 5/2007 | Putterman et al. |
| 7,234,026 B2 | 6/2007 | Robbin et al. |
| 7,277,928 B2 | 10/2007 | Lennon |
| 7,301,857 B2 | 11/2007 | Shah et al. |
| 7,356,679 B1 | 4/2008 | Le et al. |
| 7,508,535 B2 | 3/2009 | Hart et al. |
| 2001/0013983 A1 | 8/2001 | Izawa et al. |
| 2001/0037367 A1 | 11/2001 | Iyer |
| 2001/0041021 A1 | 11/2001 | Boyle et al. |
| 2001/0042107 A1 | 11/2001 | Palm |
| 2002/0002413 A1 | 1/2002 | Tokue |
| 2002/0013784 A1 | 1/2002 | Swanson |
| 2002/0045961 A1 | 4/2002 | Gibbs et al. |
| 2002/0046315 A1 | 4/2002 | Miller et al. |
| 2002/0055934 A1 | 5/2002 | Lipscomb et al. |
| 2002/0090912 A1 | 7/2002 | Cannon et al. |
| 2002/0116082 A1 | 8/2002 | Gudorf |
| 2002/0152045 A1 | 10/2002 | Dowling et al. |
| 2002/0156833 A1 | 10/2002 | Maurya et al. |
| 2002/0161865 A1 | 10/2002 | Nguyen |
| 2002/0173273 A1 | 11/2002 | Spurgat et al. |
| 2002/0189426 A1 | 12/2002 | Hirade et al. |
| 2002/0189429 A1 | 12/2002 | Qian et al. |
| 2002/0199043 A1 | 12/2002 | Yin |
| 2003/0037254 A1 | 2/2003 | Fischer et al. |
| 2003/0046434 A1 | 3/2003 | Flanagin et al. |
| 2003/0050092 A1 | 3/2003 | Yun |
| 2003/0074457 A1 | 4/2003 | Kluth |
| 2003/0076301 A1 | 4/2003 | Tsuk et al. |
| 2003/0076306 A1 | 4/2003 | Zadesky |
| 2003/0079038 A1 | 4/2003 | Robbin et al. |
| 2003/0095096 A1 | 5/2003 | Robbin et al. |
| 2003/0097379 A1 | 5/2003 | Ireton |
| 2003/0104835 A1 | 6/2003 | Douhet |
| 2003/0128192 A1 | 7/2003 | van Os |
| 2003/0133694 A1 | 7/2003 | Yeo |
| 2003/0153213 A1 | 8/2003 | Siddiqui et al. |
| 2003/0156503 A1 | 8/2003 | Schilling et al. |
| 2003/0167318 A1 | 9/2003 | Robbin et al. |
| 2003/0176935 A1 | 9/2003 | Lian et al. |
| 2003/0229490 A1 | 12/2003 | Etter |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0069122 A1 | 4/2004 | Wilson |
| 2004/0076086 A1 | 4/2004 | Keller et al. |
| 2004/0086120 A1 | 5/2004 | Akins, III et al. |
| 2004/0094018 A1 | 5/2004 | Ueshima et al. |
| 2004/0125522 A1 | 7/2004 | Chiu et al. |
| 2004/0165302 A1 | 8/2004 | Lu |
| 2004/0177063 A1 | 9/2004 | Weber et al. |
| 2004/0198436 A1 | 10/2004 | Alden |
| 2004/0224638 A1 | 11/2004 | Fadell et al. |
| 2004/0267825 A1 | 12/2004 | Novak et al. |
| 2005/0015254 A1 | 1/2005 | Beaman |
| 2005/0053365 A1 | 3/2005 | Adams et al. |
| 2005/0108754 A1 | 5/2005 | Carhart et al. |
| 2005/0111820 A1 | 5/2005 | Matsumi et al. |
| 2005/0122315 A1 | 6/2005 | Chalk et al. |
| 2005/0123886 A1 | 6/2005 | Hua et al. |
| 2005/0152294 A1 | 7/2005 | Yu et al. |
| 2005/0160270 A1 | 7/2005 | Goldberg et al. |

| | | | |
|---|---|---|---|
| 2005/0166153 A1 | 7/2005 | Eytchison et al. | |
| 2005/0245839 A1 | 11/2005 | Stivoric et al. | |
| 2005/0248555 A1 | 11/2005 | Feng et al. | |
| 2005/0259524 A1 | 11/2005 | Yeh | |
| 2006/0013414 A1 | 1/2006 | Shih | |
| 2006/0068760 A1 | 3/2006 | Hameed et al. | |
| 2006/0088228 A1 | 4/2006 | Marriott et al. | |
| 2006/0098320 A1 | 5/2006 | Koga et al. | |
| 2006/0135883 A1* | 6/2006 | Jonsson et al. | 600/546 |
| 2006/0152382 A1 | 7/2006 | Hiltunen | |
| 2006/0155914 A1 | 7/2006 | Jobs et al. | |
| 2006/0170535 A1* | 8/2006 | Watters et al. | 340/10.41 |
| 2006/0190577 A1 | 8/2006 | Yamada | |
| 2006/0221788 A1 | 10/2006 | Lindahl et al. | |
| 2006/0265503 A1 | 11/2006 | Jones et al. | |
| 2006/0272483 A1 | 12/2006 | Honeywell | |
| 2007/0028009 A1 | 2/2007 | Robbin et al. | |
| 2007/0124679 A1 | 5/2007 | Jeong et al. | |
| 2007/0135225 A1* | 6/2007 | Nieminen et al. | 473/212 |
| 2007/0255163 A1* | 11/2007 | Prineppi | 600/549 |

FOREIGN PATENT DOCUMENTS

| | | |
|---|---|---|
| DE | 44 45 023 A1 | 6/1996 |
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1 213 643 | 6/2002 |
| EP | 1 289 197 | 3/2003 |
| EP | 1 503 363 | 2/2005 |
| EP | 1536612 | 6/2005 |
| EP | 1 566 743 | 8/2005 |
| EP | 1566948 | 8/2005 |
| EP | 1 372 133 | 12/2005 |
| EP | 1 686 496 | 8/2006 |
| GB | 2 370 208 | 6/2002 |
| GB | 2384399 | 7/2003 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 2000-90651 | 3/2000 |
| JP | 2000-224099 | 8/2000 |
| JP | 2000-285643 | 10/2000 |
| JP | 2000-299834 | 10/2000 |
| JP | 2000-311352 | 11/2000 |
| JP | 2000-339864 | 12/2000 |
| JP | 2001-236286 | 8/2001 |
| JP | 2001-312338 | 11/2001 |
| JP | 2002-076977 | 3/2002 |
| JP | 2002-175467 | 6/2002 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-219731 | 8/2004 |
| JP | 2004-220420 | 8/2004 |
| KR | 20010076508 | 8/2001 |
| WO | WO 95/16950 | 6/1995 |
| WO | 98/17032 | 4/1998 |
| WO | WO 99/28813 | 6/1999 |
| WO | WO 00/22820 | 4/2000 |
| WO | WO 01/33569 | 5/2001 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/036457 | 5/2003 |
| WO | WO 03/067202 | 8/2003 |
| WO | 2004/061850 A1 | 7/2004 |
| WO | WO 2004/055637 | 7/2004 |
| WO | WO2004/084413 A2 | 9/2004 |
| WO | WO 2004/104815 | 12/2004 |
| WO | WO 2005/031737 | 4/2005 |
| WO | 2005/048644 | 5/2005 |
| WO | WO 2005/008505 | 7/2005 |
| WO | 2005/109781 | 11/2005 |
| WO | WO 2006/040737 | 4/2006 |
| WO | 2006/071364 | 6/2006 |

OTHER PUBLICATIONS

"Apple Introduces iTunes / World's Best and Easiest To Use Jukebox Software," Macworld Expo, San Francisco, Jan. 9, 2001.

"Apple's iPod Available in Stores Tomorrow," Press Release, Apple Computer, Inc., Nov. 9, 2001.

"Nomad Jukebox," User Guide, Creative Technology Ltd., Version 1, Aug. 2000.

"SoundJam MP Plus Manual, version 2.0" / MP3 Player and Encoder for Macintosh by Jeffrey Robbin, Bill Kincaid and Dave Heller, manual by Tom Negrino, published by Casady & Greene, Inc., 2000.

"12.1" 925 Candela Mobile PC", downloaded from LCDHardware. com on Dec. 19, 2002, http://www.lcdharware.com/panel/12_1_panel/default.asp.

"BL82 Series Backlit Keyboards", www.tg3electronics.com/products/backlit/backlit.htm, downloaded Dec. 19, 2002.

"Bluetooth PC Headsets—Enjoy Wireless VoIP Conversations: 'Connecting' Your Bluetooth Headset With Your Computer", Bluetooth PC Headsets; downloaded on Apr. 29,2006 from http://www.bluetoothpcheadsets.com/connect.htm.

"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].

"Digital Still Cameras—Downloading Images to a Computer," Mimi Chakarova et al., Multi/Media Reporting and Convergence, 2 pgs., May 9, 2005.

"Eluminx Illuminated Keyboard", downloaded Dec. 19, 2002, http://www.elumix.com/.

"How to Pair a Bluetooth Headset & Cell Phone", About.com; downloaded on Apr. 29, 2006 from http://mobileoffice.about.com/od/usingyourphone/ht/blueheadset_p.htm.

"Peripherals for Industrial Keyboards & Pointing Devices", Stealth Computer Corporation, downloaded on Dec. 19, 2002, http://www.stealthcomputer.com/peropherals_oem.htm.

"Poly/Optical Fiber Optic Membrane Switch Backlighting", downloaded Dec. 19, 2002, http://www.poly/optical.com/membrane_switches.html.

"Public Safety Technologies Tracer 2000 Computer", downloaded Dec. 19, 2002, http://www.pst911.com/traver.html.

"QuickTime Movie Playback Programming Guide", Apple Computer, Inc., Aug. 11, 2005.

"QuickTime Overview", Apple Computer, Inc., Aug. 11, 2005.

"Rocky Matrix Backlit Keyboard", downloaded Dec. 19, 2002, http://www.amrel.com/asi_matrixkeyboard.html.

"Sony Ericsson to introduce Auto pairing to improve Bluetooth connectivity between headsets and phones", Sep. 28, 2005 Press Release, Sony Ericsson Corporate; downloaded on Apr. 26, 2006 from http://www.sonyericsson.com/spg.jsp?cc=global&1c=en&ver=4001&template=pc3_1_1&z . . . .

"TAOS, Inc., Announces Industry's First Ambient Light Sensor to Convert Light Intensity to Digital Signals", www.taosinc.com/pressrelease_090902.htm, downloaded Jan. 23, 2003.

"Toughbook 28: Powerful, Rugged and Wireless", Panasonic: Toughbook Models, downloaded Dec. 19, 2002, http:www.panasonic.com/computer/notebook/html/01a_s8.htm.

"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.
"WhyBuy: Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built/in Pedometer, Oregon Scientific, downloaded on Jul. 31, 2006 from http://www2.oregonscientific.com/shop/product.asp?cid=4&scid=11&pid=581.
Adam C. Engst, "SoundJam Keeps on Jammin'," Jun. 19, 2000, http://db.tidbits.com/getbits.acgi?tbart=05988.
Alex Veiga, "AT&T Wireless Launching Music Service," Yahoo! Finance, Oct. 5, 2004, pp. 1/2.
Andrew Birrell, "Personal Jukebox (PJB)," Oct. 13, 2000, http:/birrell.org/andrew/talks/pjb/overview.ppt.
Apple iPod Technical Specifications, iPod 20GB and 60GB Mac + PC, downloaded from http://www.apple.com/ipod/color/specs.html on Aug. 8, 2005.
Bociurkiw, Michael, "Product Guide: Vanessa Matz,", www.forbes.com/asap/2000/1127/vmartz_print.html, Nov. 27, 2000.
Compaq, "Personal Jukebox," Jan. 24, 2001, http://research.compaq.com/SRC/pjb/.
Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].
Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].
Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].
De Herrera, Chris, "Microsoft ActiveSync 3.1," Version 1.02, Oct. 13, 2000.
iAP Sports Lingo 0x09 Protocol V1.00, May 1, 2006.
IEEE 1394—Wikipedia, 1995, http://www.wikipedia.org/wiki/Firewire.
Written Opinion of the International Searching Authority dated Nov. 24, 2006 in PCT Application No. PCT/U52005/046797.
International Search Report dated Feb. 4, 2003 in corresponding application No. PCT/US2002/033330.
International Search Report dated Jul. 10, 2007 in corresponding application No. PCT/US2006/048738.
International Search Report dated Apr. 5, 2006 from corresponding International Application No. PCT/U52005/038819.
International Search Report dated Jul. 2, 2007 in related case PCT/US2006/048669.
International Search Report dated Jun. 19, 2007 in related Application PCT/US2006/048753.
International Search Report dated May 21, 2007 from corresponding PCT Application No. PCT/US2006/048670.
International Search Report in corresponding European Application No. 06256215.2 dated Feb. 20, 2007.
Invitation to Pay Additional Fees and Partial Search Report for conesponding PCT Application No. PCT/US2005/046797 dated Jul. 3, 2006.
iTunes 2, Playlist Related Help Screens, iTunes v2.0, Apple Computer, Inc., Oct. 23, 2001.
iTunes, Playlist Related Help Screens, iTunes v1.0, Apple Computer, Inc., Jan. 2001.
Jabra Bluetooth Headset User Manual; GN Netcom A/s, 2005.
Jabra Bluetooth Introduction; GN Netcom A/S, Oct. 2004.
Jabra FreeSpeak BT200 User Manual; Jabra Corporation, 2002.
Kennedy, "Digital Data Storage Using Video Disc," IBM Technical Disclosure Bulletin, vol. 24, No. 2, Jul. 1981.
Miniman, "Applian Software's Replay Radio and Player v1.02," Product review, pocketnow.com, http://www.pocketnow.com/reviews/replay/replay.htm, Jul. 31, 2001.

Musicmatch, "Musicmatch and Xing Technology Introduce Musicmatch Jukebox," May 18, 1998, http://www.musicmatch.com/info/company/press/releases/?year=1998&release=2.
Nonhoff/Arps, et al., "Straßenmusik Portable MP3/Spieler mit USB/Anschluss," CT Magazin Fuer Computer Technik, Verlag Heinz Heise GMBH, Hannover DE, No. 25, Dec. 4, 2000.
International Search Report dated Nov. 24, 2006 in PCT Application No. PCT/US2005/046797.
Personal Jukebox (PJB), "Systems Research Center and PAAD," Compaq Computer Corp., Oct. 13, 2000, http://research.compaq.com/SRC/pjb/.
Peter Lewis, "Two New Ways to Buy Your Bits," CNN Money, Dec. 31, 2003, pp. 1/4.
Sastry, Ravindra Wadali. "A Need for Speed: A New Speedometer for Runners", submitted to the Department of Electrical Engineering and Computer Science at the Massachusetts Institute of Technology, May 28, 1999.
Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208/212.
SoundJam MP Plus, Representative Screens, published by Casady & Greene, Inc., Salinas, CA, 2000.
Specification Sheet, iTunes 2, Apple Computer, Inc., Oct. 31, 2001.
Spiller, Karen. "Low/decibel earbuds keep noise at a reasonable level", The Telegraph Online, dated Aug. 13, 2006, http://www.nashuatelegraph.com/apps/pbcs.dll/article?Date=20060813&Cate.. Downloaded Aug. 16, 2006.
Steinberg, "Sonicblue Rio Car," Product Review, Dec. 12, 2000, http://electronics.cnet.com/electronics/0/6342420/1304/4098389.html.
Travis Butler, "Archos Jukebox 6000 Challenges Nomad Jukebox," Aug. 13, 2001, http://db.tidbits.com/getbits.acgi?tbart=06521.
Travis Butler, "Portable MP3: The Nomad Jukebox," Jan. 8, 2001, http://db.tidbits.com/getbits.acgi?tbart=06261.
U.S. Appl. No. 11/621,541, "Personalized Podcasting Podmapping" filed Jan. 9, 2007.
Waterproof Music Player with FM Radio and Pedometer User Manual, Oregon Scientific, 2005.
Apple iTunes Smart Playlists, downloaded Apr. 5, 2005 from http://web.archive.org/web/20031002011316/www.apple.com/itunes/smartplaylists.... pp. 1-2.
International Search Report dated Dec. 5, 2007 in PCT Application No. PCT/US2007/004810.
International Search Report in Patent Application No. PCT/US2006/048738 dated Jan. 29, 2008.
International Search Report in Patent Application No. PCT/US2007/077020 dated Jan. 28, 2008.
International Search Report in Patent Application No. PCT/US2007/076889 dated Jan. 28, 2008.
iTunes, Wikipedia: The Free Encyclopedia; downloaded on Oct. 5, 2005, pp. 1-6.
Nutzel et al., "Sharing Systems for Future HiFi Systems", The Computer Society, Jun. 2004.
Partial Search Report dated Sep. 6, 2007 in PCT Application No. PCT/US2007/004810.
Written Opinion dated Dec. 5, 2007 in PCT Application No. PCT/US2007/004810.
Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Office Action dated Feb. 1, 2008 in U.S. Appl. No. 11/327,544.
Hart-Daves, Guy. "How To Do Everything With Your iPod and iPod Mini", 2004, McGraw-Hill Professional, p. 33.
Office Action dated Feb. 4, 2008 in U.S. Appl. No. 11/566,072.
"Creative liefert erstes Portable Media Center aus" [Online] Sep. 2, 2004, Retrieved from the internet on Sep. 20, 2007 from http://www.golem.de/0409/33347.html>.
International Search Report dated Feb. 18, 2008 in Patent Application No. PCT/US2007/079766.

International Search Report Dated Sep. 27, 2007 in Application No. 05824296.7.
Office Action dated Apr. 4, 2008 in U.S. Appl. No. 11/212,555.
Office Action dated Feb. 20, 2008 in Japanese Application No. 2007-538196.
Office Action dated Feb. 25, 2008 in U.S. Appl. No. 11/749,599.
Office Action dated Mar. 4, 2008 from U.S. Appl. No. 10/973,657.
Partial International Search Report dated Feb. 1, 2008 in Patent Application No. PCT/US2007/010630.
Written Opinion dated Feb. 18, 2008 in Patent Application No. PCT/US2007/079766.
Search Report dated Mar. 20, 2008 in Patent Application No. PCT/US2007/077789.
Written Opinion dated Mar. 20, 2008 in Patent Application No. PCT/US2007/077789.
Invitation to Pay Additional Fees and Partial Search Report for PCT Application No. PCT/US2007/077160 dated Apr. 1, 2008.
"Combination Belt Clip Leaf Spring and Housing Latch", Wandt et al.; Motorola Technical Developments, Motorla Inc. Schaumburg, IL. vol. 18, Mar. 1, 1993.
Notification of Reason for Rejection from PCT Application No. 2003-539048 dated Nov. 27, 2007.
"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.
International Search Report dated Jul. 7, 2008 in PCT Application No. PCT/US2007/076793.
International Search Report dated Jun. 10, 2008 in PCT Application No. PCT/US2007/010630.
Kadir et al., "Adaptive Fast Playback-Based Video Skimming Using a Compressed-Domain Visual Complexity Measure", 2004 IEEE International Conference on Multimedia and Expo, pp. 2055-2058.
Office Action dated Jun. 17, 2008 in U.S. Appl. No. 11/212,313.
Office Action dated May 30, 2008 in Chinese Patent Application No. 02825938.6.
Office Action dated Oct. 16, 2008 in U.S. Appl. No. 11/327,544.
Office Action in Japanese Patent Application No. 2008-045351 dated Aug. 5, 2008.
Office Action in U.S. Patent Appl. No. 11/212,555 dated Aug. 14, 2008.
Search Report dated May 15, 2008 in PCT Application No. PCT/US2007/019578.
Written Opinion dated Jul. 7, 2008 in PCT Application No. PCT/US2007/076793.
Written Opinion dated Jun. 10, 2008 in PCT Application No. PCT/US2007/010630.
Written Opinion dated May 15, 2008 in PCT Application No. PCT/US2007/019578.
Yee et al., "Faceted Metadata for Image Search and Browsing." Association For Computing Machinery, Conference Proceedings, Apr. 5, 2003.
Notice of Allowance dated Apr. 21, 2009 in U.S. Appl. No. 11/327,544.
Office Action in European Patent Application No. 05 855 368.6 dated Nov. 20, 2008.
Office Action dated Dec. 15, 2008 in U.S. Appl. No. 11/212,313.
Notice of Allowance dated Dec. 18, 2008 in U.S. Appl. No. 11/212,555.
International Search Report dated Oct. 10, 2008 in PCT Application No. PCT/US2007/077160.
Written Opinion dated Oct. 10, 2008 in PCT Application No. PCT/US2007/077160.
Office Action dated Jan. 26, 2009 in U.S. Appl. No. 11/373,468.
Office Action dated Sep. 1, 2008 in EP Application No. 06 256 215.2.
Written Opinion dated Jan. 6, 2009 in Singapore Application No. 0701865-8.
Office Action dated Mar. 30, 2009 in U.S. Appl. No. 11/515,270.
Office Action dated Apr. 9, 2009 in U.S. Appl. No. 11/583,199.

* cited by examiner

EVENT RECORDER FOR PORTABLE MEDIA DEVICE

FIELD OF INVENTION

The present invention relates generally to portable electronic devices. More particularly, the present invention relates to sensing devices used to record events that affect the operability of portable electronic devices.

DESCRIPTION OF RELEVANT ART

The small size and lightweight of many popular portable electronic consumer products (media players, cell phones, laptops) make such products particularly susceptible to events (e.g., dropping, immersion in water, exposure to temperature extremes, humidity, etc.) that can render them either completely or partially inoperable. For example, a severe shock or vibration can render display elements of a display on a portable electronic device inoperative. Sometimes, as a result, a user may request that the manufacturer repair the damaged device. Moreover, the user may also request that such repairs be made free of charge if the user believes the damage is a result of a product design defect or covered by a manufacturer's warranty.

It is therefore important for the manufacturer to be able to determine if the damage to the device was caused by product defect or by warranty voiding user actions. Such user actions include, for example, abusive behavior (e.g., immersion in water, dropping, throwing, etc.), unauthorized opening of the device housing, improper battery charging, etc. By being able to determine the likely cause of the damage, the manufacturer can distinguish defects from improper use. By recording relevant information, the manufacturer can also save the time and expense of dealing with device owners who may or may not understand the source of the problem.

Therefore it is desirable to be able to record an event in a portable electronic device that can be used to, at least, evaluate an operational status of a portable electronic device such as a hand-held, wearable, and other miniature device.

SUMMARY

The invention pertains to methods, systems, and apparatus for recording an event and associated event data in a portable electronic device. The recorded event data can be used at least to evaluate an operational status of a portable electronic device such as media players, cell phones, laptop computers, and the like. In one embodiment, the portable electronic device includes appropriate event monitoring and recording capabilities that can take the form of a standalone sensing unit. By providing monitoring and recording capabilities, more efficient and accurate fault analysis can be provided that, in turn, can facilitate product design and may reduce cost of repair by more clearly delineating if any recorded event (usually user initiated) has voided a current product warranty.

Several embodiments of the invention are discussed below.

As a method for recording an event in a portable electronic device the method is carried out by performing at least the following operations: monitoring the portable electronic device for at least one physical occurrence expressed as a parameter having a parameter value; designating the physical occurrence as an event when the associated parameter value reaches or exceeds a parameter threshold value; and recording event data corresponding to the event. In one aspect of the invention, the recorded event data can be used to evaluate the operational status of the portable electronic device.

As a portable electronic consumer product, one embodiment of the invention includes, at least: a sensing unit arranged to monitor the consumer electronic product for at least one physical occurrence expressed as a parameter having a parameter value; a processor coupled to the sensing unit arranged to, at least, receive the parameter value from the sensing unit and designate the physical occurrence as an event when the parameter value reaches or exceeds a parameter threshold value; and a recording device coupled to the processor arranged to, at least, record event data corresponding to the event.

As computer program product executable by a processor for recording an event in a portable electronic device, one embodiment of the invention includes at least: computer code for monitoring the portable electronic device for at least one physical occurrence expressed as a parameter having a parameter value; computer code for designating the physical occurrence as the event when the associated parameter value reaches or exceeds a parameter threshold value; computer code for recording event data corresponding to the event; and computer readable medium for storing the computer code.

As a system, one embodiment of the invention includes at least: a portable electronic consumer product, having a sensing unit arranged to monitor the consumer electronic product for at least one physical occurrence expressed as a parameter having a parameter value; a processor coupled to the sensing unit arranged to, at least, receive the parameter value from the sensing unit and designate the physical occurrence as an event when the parameter value reaches or exceeds a parameter threshold value; a recording device coupled to the processor arrange to, at least, record event data corresponding to the event, and an external circuit in communication with at least the portable electronic consumer product arranged to evaluate the current operational status of the portable electronic consume product using the recorded event data.

Other aspects and advantages of the invention will become apparent from the following detailed description, taken in conjunction with the accompanying drawings, illustrating by way of example the principles of the invention.

DETAILED DESCRIPTION

Figure 1:
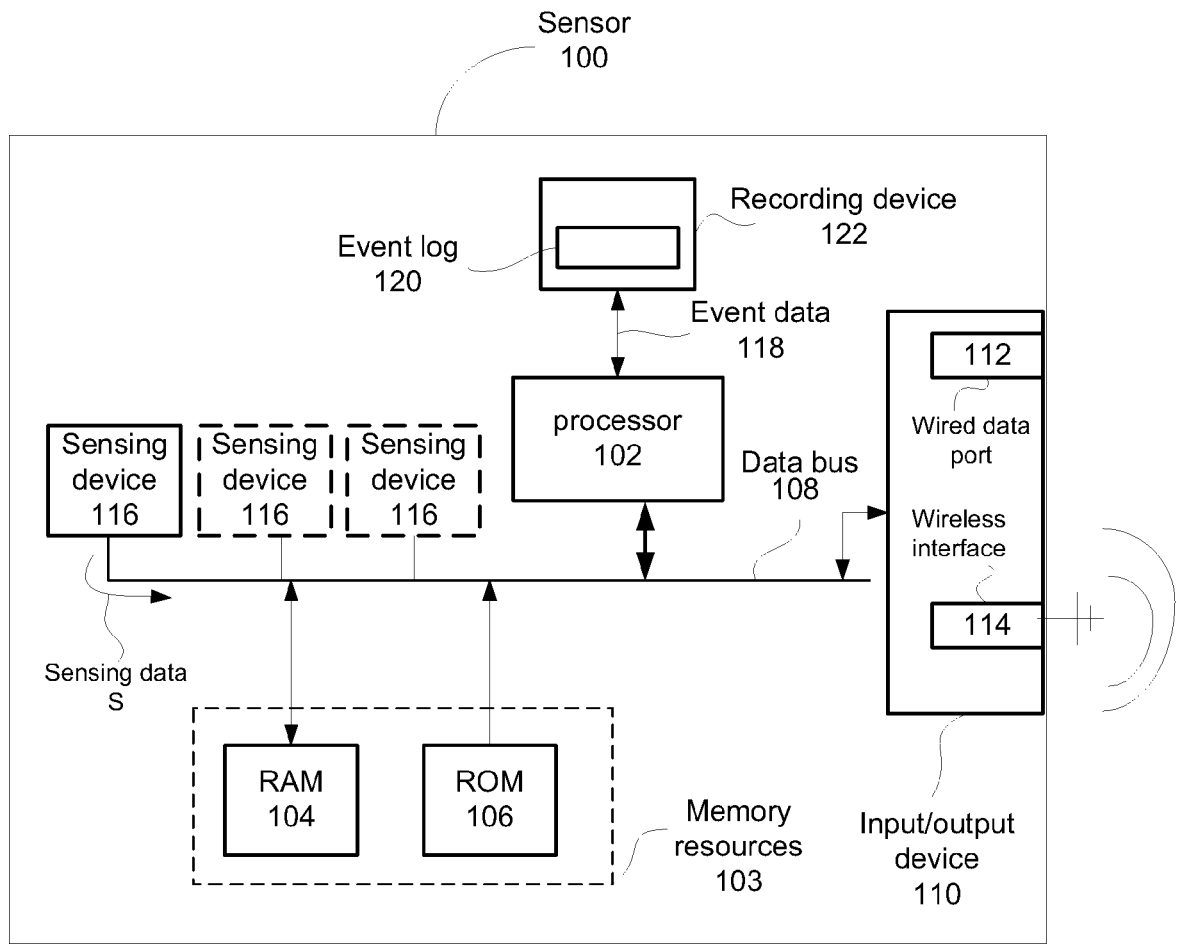
FIG. 1 illustrates an example of a data-gathering device (sensor) in the form of sensing unit in accordance with an embodiment of the invention.

Reference will now be made in detail to selected embodiments of the invention, an example of which is illustrated in the accompanying drawings. While the invention will be described in conjunction with selected embodiments, it will be understood that it is not intended to limit the invention to one particular embodiment. To the contrary, it is intended to cover alternatives, modifications, and equivalents as may be included within the spirit and scope of the invention as defined by the appended claims.

A portable electronic device can suffer loss of function due to manufacturing or product defects or user events. Such user events can include exposing the device to extreme temperatures (either high or low) or exposing the device to physical shock or stress (e.g., dropping the device or attempting to open the device housing). Other potentially damaging events include improper use of the device over an extended period of time (e.g., improper battery charging, repeatedly dropping the device). Since the occurrence of a single event may not, in itself, cause damage it may be necessary to record multiple events to distinguish between user and manufacturer related damage. For example, dropping the device once or even twice may not result in damage to the device, but numerous shocks over an extended time can have a cumulative effect that can result in the device being damaged. In addition to isolated events, a user may be operating the device in a manner that can damage the device or otherwise reduce its useful operating life. For example, if the user does not properly charge the battery, then the battery lifetime can be severely reduced.

It is also desirable for both the user and manufacturer that when such events are recorded, that a warning notice be issued that informs the user that a potentially damaging event has just occurred (i.e., the device has been dropped), or has occurred a number of times (i.e., the device has been repeatedly dropped), or that the user is operating the device in an improper manner (i.e., improperly charging the battery). In this way, not only does the manufacturer have the data to help determine the likely cause of damage, the user is put on notice that the device is being operated by the user in a manner that can result in damage to the device.

Generally, the invention relates to monitoring at least one parameter in a portable electronic device (e.g., a cell phone, laptop, or media player). An event occurs when a monitored parameter value reaches or exceeds a pre-determined threshold value. Event data can be recorded and subsequently analyzed (by a manufacturer, for example) to evaluate an operating status of the portable electronic device. For example, if the portable electronic device is not operating properly (or at all) or has been damaged in some way, the event data can be used to determine a likely cause of the device malfunction and/or device damage. Furthermore, in those situations where an event has been improperly or only partially recorded (due, for example, to the device failing during the recording or a defective recording device or a recording device that becomes defective due to the event being recorded and so on), the partially or improperly recorded data can be used to evaluate the current operational status of the device. For example, if an event occurs (such as a device being dropped) while another event (temperature over or under limit, for example) is being recorded, any event data in the process of being or already having been recorded can be corrupted leaving only a portion of the recorded data available for subsequent evaluation. In these situations, the uncorrupted data can be retrieved and used to evaluate the current operational status of the device.

Furthermore, a warning notice can be timely issued notifying a user that an event (or events) has occurred that may result in damage to the device if corrective actions are not taken. Sensors that can be used in embodiments of this invention include temperature sensors, pressure sensors, stress/strain sensors, accelerometers, shock sensors, vibration sensors, position sensors, sensors that detect thermal exposure, optical exposure, x-ray exposure, microwave exposure, pollutants, and the like many of which are commercially available.

FIG. 1 illustrates an example of a data-gathering device in the form of sensor 100 in accordance with an embodiment of the invention. Sensor 100 can include processor 102 for controlling the overall operation of sensor 100. Sensor 100 can also include memory resources 103 that can include RAM 104 that can provide volatile data storage and Read-Only Memory (ROM) 106 that can store programs, utilities or processes each of which can be coupled to processor 102 by way of data bus 108. Sensor 100 can also include input/output device 110 that can allow an external circuit (such as an external processor or an evaluator unit) to interact with sensor 100. For example, input/output (I/O) device 110 can include wired data port 112 that can communicate with an external signal cable by way of a connector (not shown). I/O device 110 can also include wireless interface 114 that can provide a wireless communication channel that can be used for transmission and receiving data between sensor 100 and external circuitry. Such communication channels can be formed using, for example, RF carrier waves, infrared (IR) signals, etc.

Figure 2:
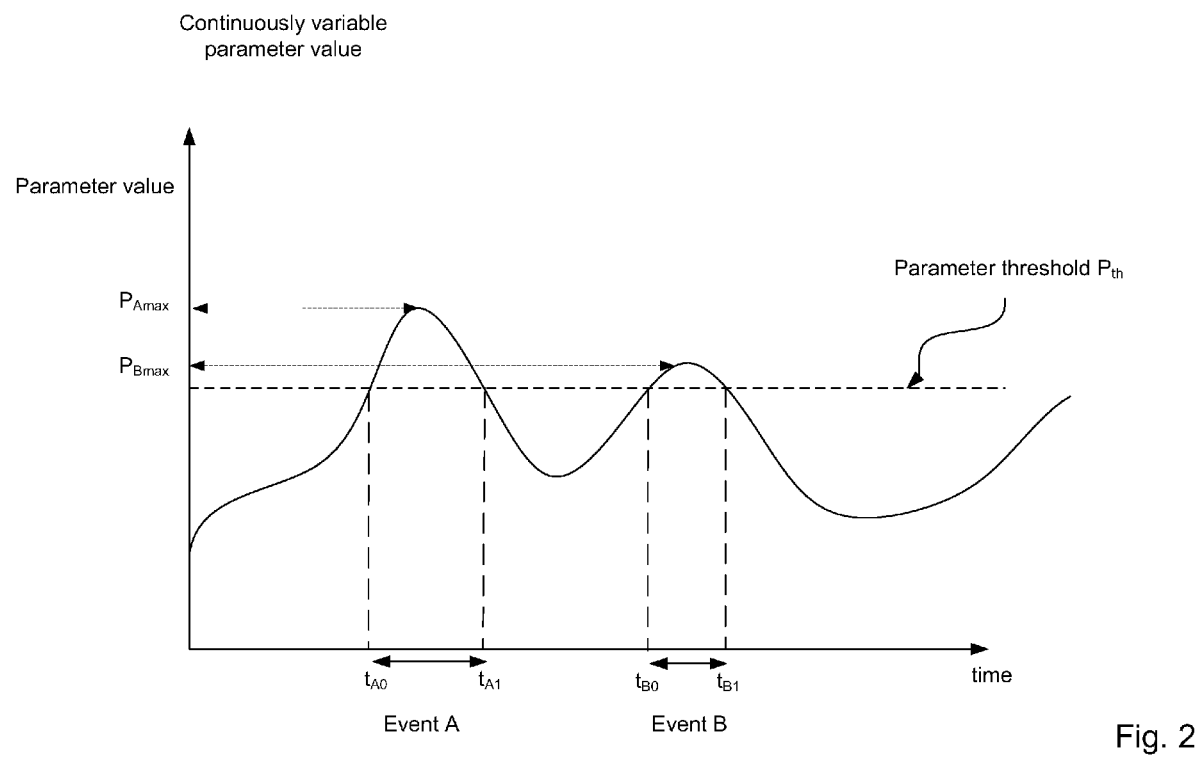
FIG. 2 shows a representative response of sensor to the monitoring of a continuously variable parameter (such as temperature) in accordance with an embodiment of the invention.
Figure 3:
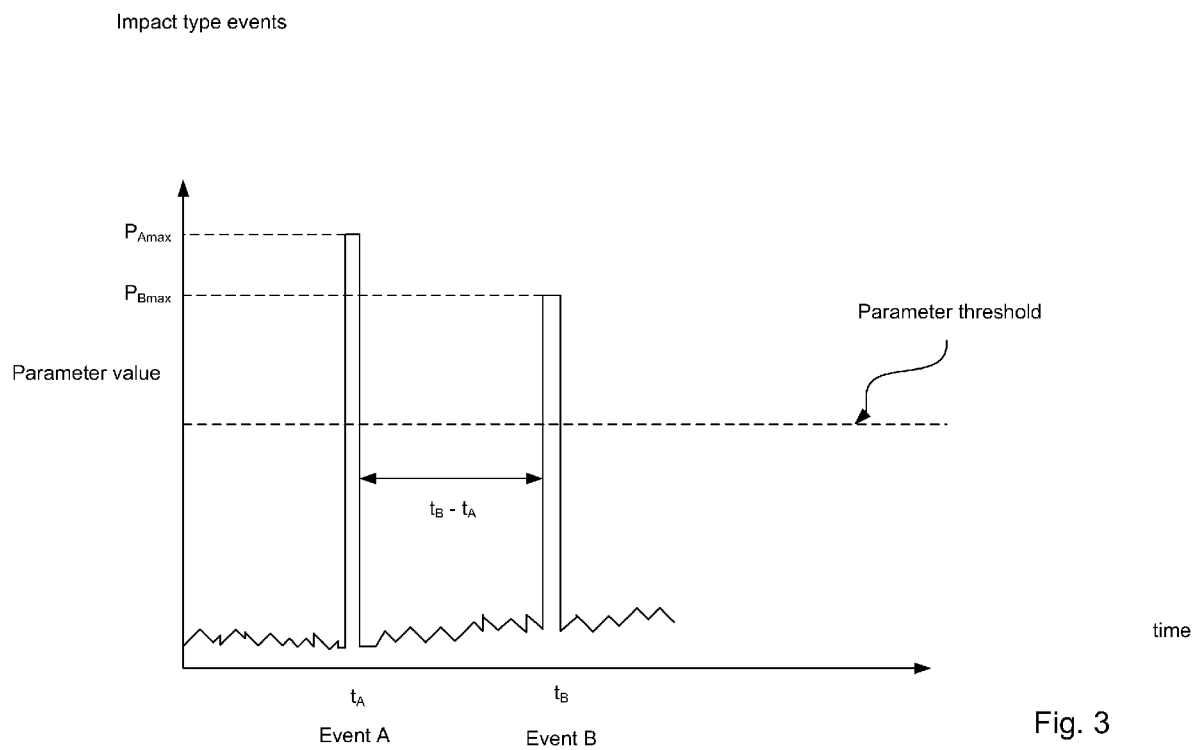
FIG. 3 shows a representative response of a sensor to the monitoring of a short duration event (such as an impact) in accordance with an embodiment of the invention.

Sensor 100 can also include sensing device(s) 116 that can detect a change in a parameter (expressed as a parameter value) associated with the one or more physical occurrences. Therefore, sensing device 116 can have a dynamic range that covers the expected parameter value of the physical occurrence to be monitored and can withstand the operating conditions to which it may be exposed. For example, FIG. 2 shows a representative response of sensing unit 116 to the monitoring of a physical occurrence (exposure to heat/cold) expressed as continuously variable parameter (i.e., temperature) in accordance with an embodiment of the invention. In the context of this discussion, an event occurs whenever a physical occurrence has a parameter value that reaches or exceeds a parameter threshold $P_{th}$. For example, event A can be said to occur when processor 102 determines that parameter value P (received from sensing unit 116 in the form of sensing signal S) exceeds parameter threshold $P_{th}$ (at time $t_{A0}$, for example) for at least a duration of time $(t_{A1}-t_{A0})$. Similarly, event B can be said to occur when processor 102 determines that parameter value P exceeds parameter threshold $P_{th}$ (at time $t_{B0}$, for example) for at least a duration of time $(t_{14}-t_{B0})$. Some sensors (or corresponding constituent sensing units), however, are more suited for monitoring events of a discontinuous nature (such as an impact having a short or indeterminate duration) an example of which can be seen in FIG. 3. In these cases, an event can be said to occur when processor 102 determines that parameter value P has reached or exceeded the parameter threshold value $P_{th}$ at a time $t_a$ and/or $t_b$.

Once processor 102 has determined that an event has occurred, processor 102 can process sensing data S received from sensing unit 116 into associated event data 118 that can then be forwarded and stored event log 120 in recording device 122. Event data 118 can include time of occurrence, date of occurrence, duration of occurrence, maximum (or minimum) parameter value, and so on. For example, in FIG. 2, event data 118 can include information related to a difference between parameter threshold value $P_{th}$ and maximum parameter value $P_{max}$ (for example, with respect to event A, event data 118 can include information related to the difference between $P_{Amax}$-$P_{th}$) or more simply as a maximum value of parameter value P during a particular event ($P_{Amax}$ or $P_{Bmax}$, for example).

If recording device 122 is electronic in nature (such as volatile memory devices), then event data 118 can be recorded as a change in bit values of the memory device whereas if recording device 122 is electro-mechanical or mechanical in nature, then event data 118 can be recorded as a non-reversible state change (such as the melting of a fuse, etc.). Examples of recording devices include electrical circuits, electromechanical circuits, mechanical latching mechanisms, programmable integrated circuits such as EPROMs, fusible links, magnetic circuits, acoustic circuits, optical/IR circuits, and the like. It should be noted that event data 118 could be stored in any appropriate memory device located either within sensor 100 or external to sensor 100.

In some cases, in order to preserve power resources (which is especially important in battery powered electronic devices), recording device 122 can be configured to record an event in a non-reversible manner (such a melting of a thermocouple to indicate extreme temperature, or discoloration of a moisture sensitive tab to indicate high moisture). In this case "recording" usually means that some mechanical aspect of recording device 122 has changed in a non-reversible manner. In this way, even if sensor 100 becomes inoperable for whatever reason, an event can still be recorded even if sensor 100 is not powered or otherwise inoperable. For example, recording device 122 can be implemented as an electrical circuit having a particular resonance frequency in communication with sensing device 116 that can be a fuse in one leg of the circuit.

Furthermore, sensor 100 can be placed in an inactive, or sleep mode. However, in order to record event data when a parameter value (temperature, for example) passes a threshold value, sensor 100 can be activated (e.g., woken up). For example, if all that is required is that a temperature excursion (either hot or cold) be recorded, it is not necessary for sensor 100 to continually monitor the temperature of the device. All that is necessary is that at least one sensing unit 116 in sensor 100 provide appropriate notification to processor 102 that the monitored temperature has reached or exceeded the temperature threshold at which point processor 102 can wake up sensor 100 and complete the recordation of the event. Once the recordation of the event is complete, processor 102 can put sensor 100 back into sleep mode. By providing for a low power operational mode, valuable power resources can be preserved while still maintaining the ability to monitor parameters of interest.

It should be noted that if sensor 100 includes more than one sensing device, each sensing device could be configured to monitor different parameters, or the same parameter having different parameter threshold values in a cascade arrangement, or even different event types (e.g.; continuously variable type or impact type). In any case, each of the sensing devices can be placed in either active or sleep mode depending upon the particular event type, parameter to be monitored, and so on for which it is configured to monitor. For example, one sensing device can be configured to continuously monitor temperature and therefore be set to active mode whereas another sensing unit can be configured to concurrently monitor impacts and therefore can be set to low power mode. In this way, sensor 100 can be used to monitor separate parameters and provide corresponding event data that can be used in subsequent analysis either separately or together. For example, a piezoelectric strain sensor for measuring material strain (indicative of rough handling) can be used to determine if a device has undergone an impact type event. A temperature sensor can also be used to record any temperature events experienced by the device. The data provided by both sensing devices can be used separately or together (using cross correlation type analysis, for example) to determine if, for example, stress damage to a device housing was likely due to externally applied forces (i.e., if an impact event has been recorded but no temperature event) or related to thermal expansion/contraction (i.e., if temperature event has been recorded but no impact event). Subsequent analysis of any or all available data can be used to evaluate a likely cause of any damage or non-functionality of a device.

The invention will now be described in the context of a portable electronic consumer product that for the remainder of the discussion takes the form of a portable media player 400 that at least incorporates sensor 100.

Figure 4:
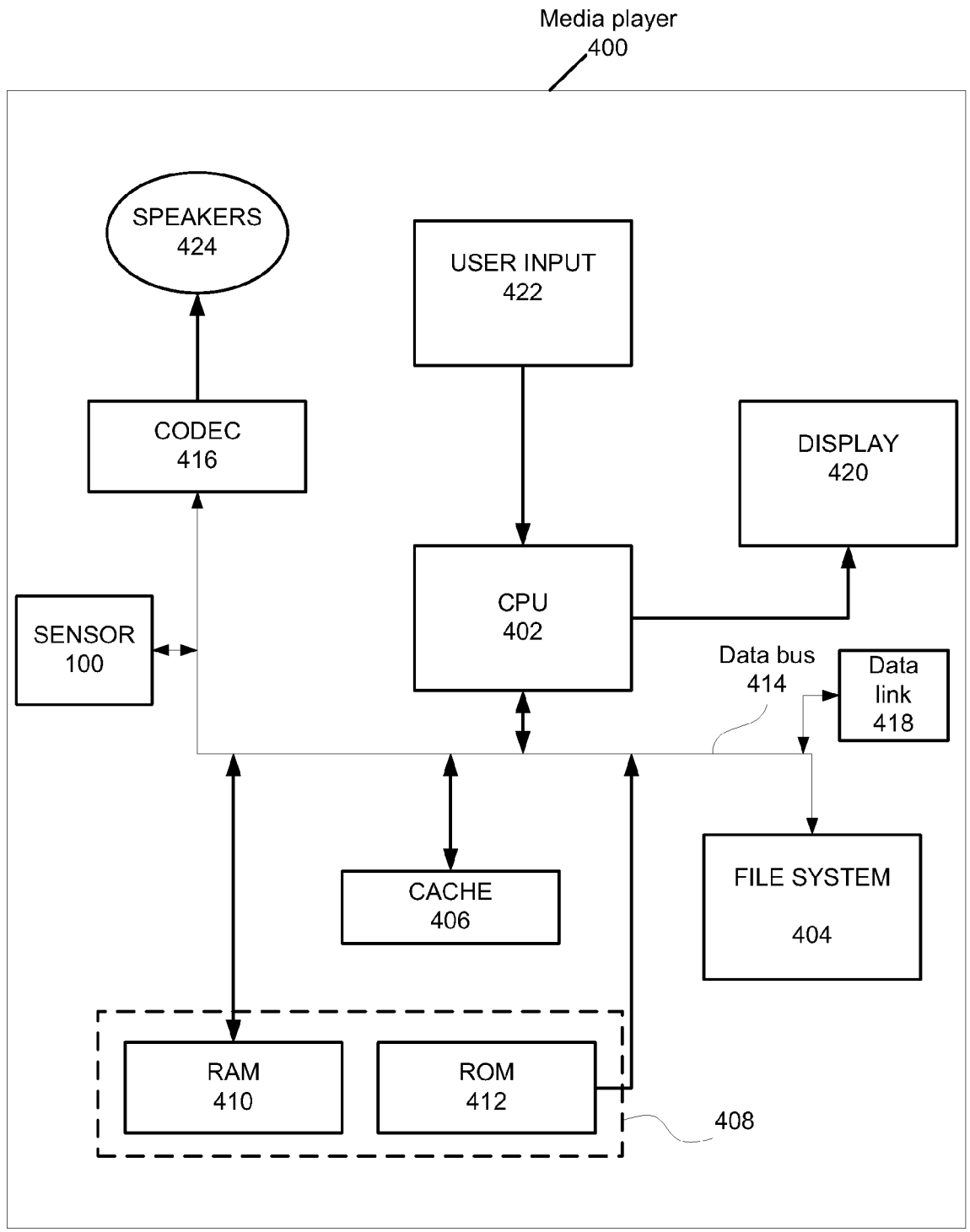
FIG. 4 shows portable media player in accordance with an embodiment of the invention.

FIG. 4 shows portable media player 400 in accordance with an embodiment of the invention that can include central processing unit (CPU) 402 for controlling the overall operation of media player 400. Media player 400 can store media data pertaining to media assets in file system 404 and/or cache 406. File system 404 can take the form of a storage disk or a plurality of disks that can provide high capacity storage capability for the media player 400. However, since the access time to file system 404 can be relatively slow, media player 400 can also include cache 406. Even though the relative access time to cache 406 can be substantially shorter than for file system 404, cache 406 typically does not have the large storage capacity of file system 404. Media player 400 can also include memory resources 408. In the described embodiment, memory resources can be configured to include RAM 410 (that can store programs, utilities or processes to be executed in a non-volatile manner) and Read-Only Memory (ROM) 412 that can store programs, utilities or processes to be executed in a non-volatile manner. Data bus 414 can facilitate data transfer between at least file system 404, cache 406, CPU 402, and CODEC 416. Media player 400 can also include data link 418 allowing media player 400 to couple to a host computer, for example. Media player 400 includes display 420 for displaying graphical, video, or images, user input 422 for receiving user supplied input commands, and speakers 424.

Sensor 100 can be configured as a stand-alone type unit along the lines described with respect to FIG. 1 and, as such, can be connected to CPU 402 by way of data bus 414. Sensor 100 can also have its own power supply (not shown) independent of that provided for media player 400. In this way, sensor 100 can monitor selected parameters and communicate with external circuitry when media player 400 is powered off or has been rendered inoperable. Sensor 100 can also be integrated with CPU 402 providing a less robust, but more cost effective embodiment since all memory and processing requirements of sensor 100 can then be performed by memory resources 408 and CPU 402, respectively. It should be noted, by utilizing on board memory resources (either memory resources 103 or memory resources 408), various threshold values used to determine whether an event has or has not occurred can be updated in a timely manner.

Figure 5:
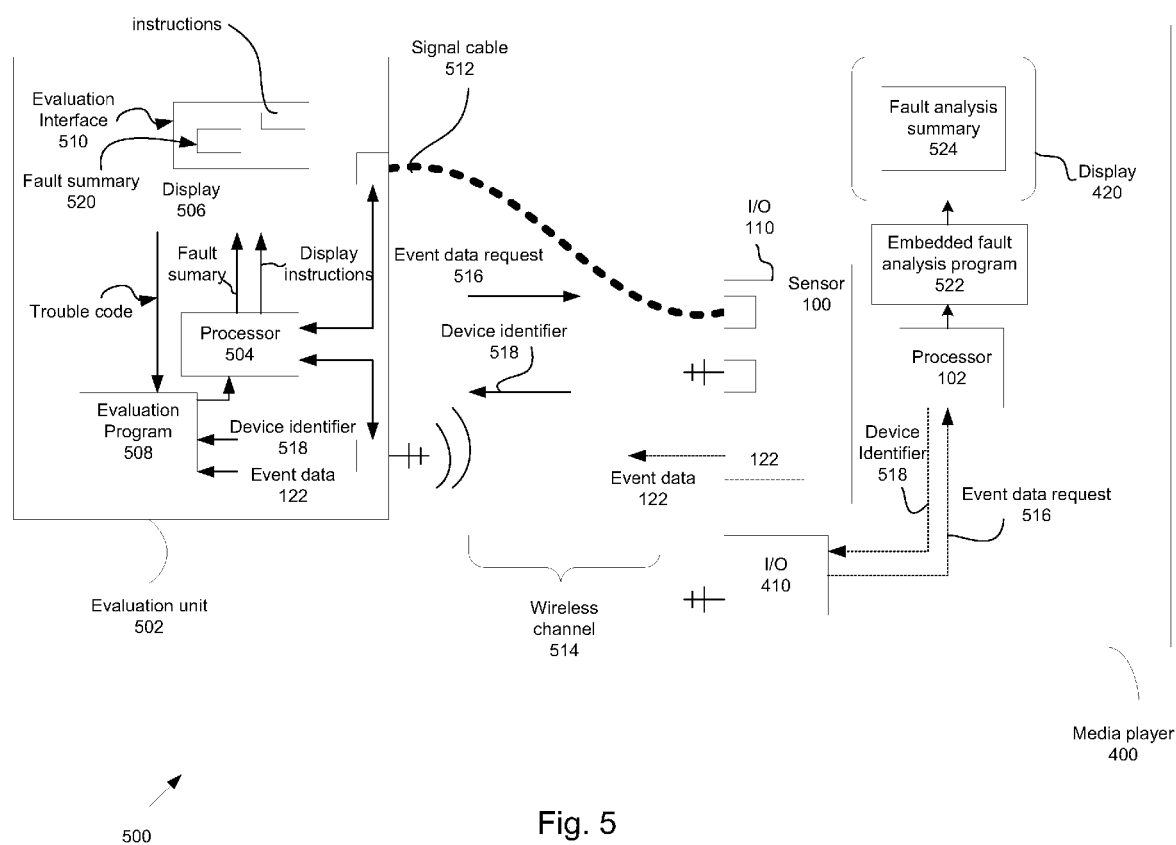
FIG. 5 shows a system having an evaluator unit for evaluating recorded event data in accordance with an embodiment of the invention.

FIG. 5 shows a system 500 used to evaluate recorded event data in accordance with an embodiment of the invention. Evaluation of recorded event data by system 500 can be put to any number of uses such as providing a repair technician information related to a likely cause of a device malfunction or defect. This information can be used to repair the device and/or inform the device owner that any repairs would or would not be covered by a warranty. For example, if the evaluation reveals that the damage to the device or device malfunction was most likely caused by improper use by the device user, then any repairs would most likely not be covered by a manufacturer warranty or at least would be at the option of the manufacturer.

Accordingly, when media player 400 is brought into a repair center, for example, for evaluation and possible repair, a repair technician can power on evaluator unit 502 that includes processor 504 for controlling operations of evaluator unit 502 and display 506 for displaying user interfaces and other relevant information/data. Once evaluator unit 502 is powered on, evaluation program 508 (typically stored in evaluator unit memory not shown for sake of clarity) can instruct processor 504 to orchestrate the evaluation process that can include, at least, displaying an evaluation interface 510 on display 506. At this point, as part of the evaluation process, a repair technician can be requested to follow a set of specific instructions as part of the evaluation interface 510. Such instructions can include, at least, visually inspecting the device and/or device housing for any external damage (a cracked housing, for example), entering a trouble code (or its equivalent) indicating the nature of the device problem if known, powering up the device (if possible), and so on. If media player 400 can not be powered up (due to a faulty power supply, for example), it may be necessary to connect evaluator unit 502 directly to sensor 100 by way of signal cable 512 or by way of wireless channel 514 if sensor 100 has wireless capabilities using RF, acoustic, or any appropriate wireless signal. Clearly, if media player 400 cannot provide power to sensor 100, then sensor 100 must be self powered or at least be able to receive power from an external power supply. In some cases, however, sensor 100 can be configured in such a way that recording device 122 can be detachable or otherwise accessible to external circuitry in such a way that any recorded event data can be retrieved without either sensor 100 or media player 400 providing any power whatsoever.

In any case, once evaluator unit 502 is in communication with sensor 100 by way of I/O 110 (or indirectly by way of I/O 410 if media player 400 is active), evaluation program 508 instruct processor 504 to send event data request 516 to sensor 100 for processing by processor 102. Processor 102 can, in turn, respond to event data request 516, in part, by transmitting device identifier 518. Device identifier 518 can provide any information that evaluation program 508 might require in order to carry out the evaluation process. For example, device identifier 518 can include information used to distinguish media player 400 from other, similar media players. In some embodiments, evaluation program 508 can use device identifier 518 to determine if media player 400 has had any previous repair sessions and if so retrieve data from those previous repair sessions stored in a server computer, for example, connected to evaluator unit 502 as part of a network of computers. In addition to device identifier 518, processor 102 can be programmed to provide event data 118 from recording device 122 without waiting for a specific data request from evaluation program 508. In any case, once evaluation program 508 has received event data 118, evaluation program 508 can use event data 118 to evaluate the current operational status of media player 400 that could include determining a likely cause of a device defect or device malfunction. For example, one type of analysis that can be carried out by evaluation program 508 can be based upon pattern analysis where a pattern of occurrence of a particular event (such as repeated improper battery charging, repeated impacts, etc.) can be correlated to observed defects or operational problems with media player 400. Another type of analysis that can be carried out by evaluation program 508 can be based upon performing a correlation analysis between certain aspects of event data 118 to known problems and their causes. For example, if it is observed that a battery in media player 400 cannot hold a proper charge and event data indicates that a user of media player 400 is not following proper charging procedures, then in all likelihood, that is the cause of the battery not holding a charge. Another example could be that event data 118 indicates that a number of warning notices have been issued by media player 400 over a period of time indicating that the media player 400 has, for example, been exposed to temperature extremes, repeated shocks, improper battery charging, etc. If media player 400 is exhibiting a problem that has been previously linked to any of the events associated with the issued warning(s), then a conclusion could be that the observed problem with media player 400 is due to that event(s) and not a design or product defect. In this case, a manufacturer could realistically decline to repair media player 400 under a manufacturer warranty. In any case, when evaluation program 508 has completed its analysis, a fault summary 520 can be displayed on display 506 indicating at least a list of faults, causes and any corrective actions.

In some cases, a user can also invoke an embedded fault analysis program 522 that can provide simplified fault analysis generated by, for example, CPU 402. In this way, real time fault analysis summary 524 along the lines of an automated trouble shooting guide can be provided to, for example, a user, repair technician, etc. on display 420. Real time fault analysis summary 524 can provide specific fault codes indicating faults detected, recommended corrective actions, and so on. In this way, a user, for example, can consult use real time fault analysis 524 to diagnose and potentially correct the problem without the need to deal with customer service thereby greatly reducing any device downtime lost in transporting the damaged device to a repair center.

Figure 6:
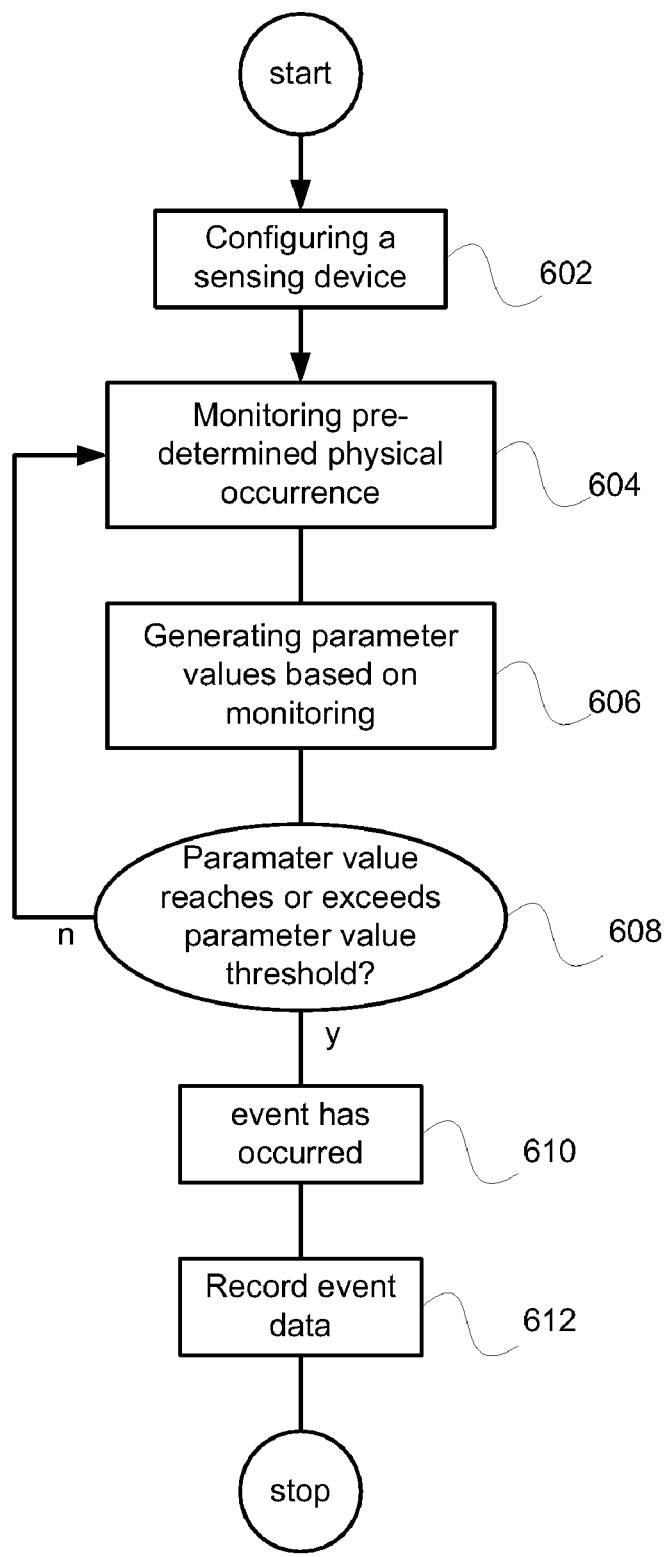
FIG. 6 shows a flowchart detailing a process for real time monitoring in accordance with an embodiment of the invention.

FIG. 6 shows a flowchart detailing a process 600 for real time monitoring of a portable electronic device in accordance with an embodiment of the invention. Process 600 begins at 602 by configuring a sensing device to monitor a selected physical occurrence that can be expressed as a parameter value. Configuring the sensing device can include setting, or resetting, a parameter threshold value, setting an operational mode (for example, low power mode, or sleep mode), connecting the sensing device to other sensing devices to form a cascade arrangement, and so on. Once the sensing device has been configured, the sensing device monitors for a pre-determined physical occurrence at 604 and generates sensing data (i.e., temperature, pressure, impact, stress, etc.) at 606 that can be expressed as a corresponding parameter value (° F., nt/cm$^2$, etc). If, at 608, the parameter value reaches or exceeds a corresponding parameter threshold value, then an event flag is issued at 610 indicating that an event has occurred. At 612, corresponding event data is recorded. Event data can include time of occurrence, date of occurrence, duration of occurrence, maximum (or minimum) parameter value, and so on.

Figure 7:
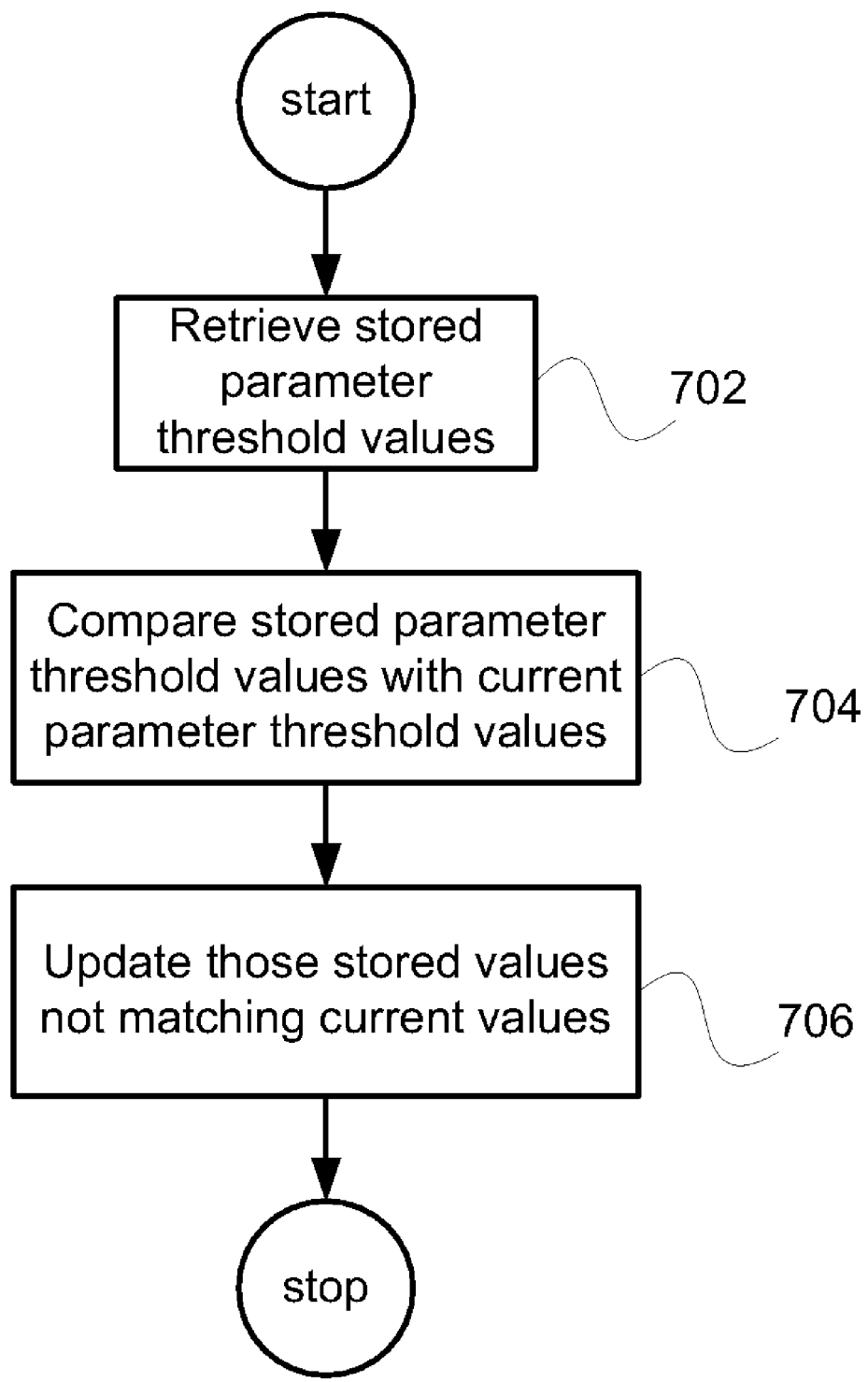
FIG. 7 illustrates a flowchart detailing a process used for updating threshold values in accordance with an embodiment of the invention.

FIG. 7 illustrates process 700 for updating parameter threshold values in accordance with an embodiment of the invention. Process 700 begins at 702 by retrieving stored parameter threshold values. At 704, current parameter threshold values are compared to stored parameter threshold values. At 706, based upon the comparison, any stored parameter threshold value not matching current parameter threshold values can be updated.

Figure 8:
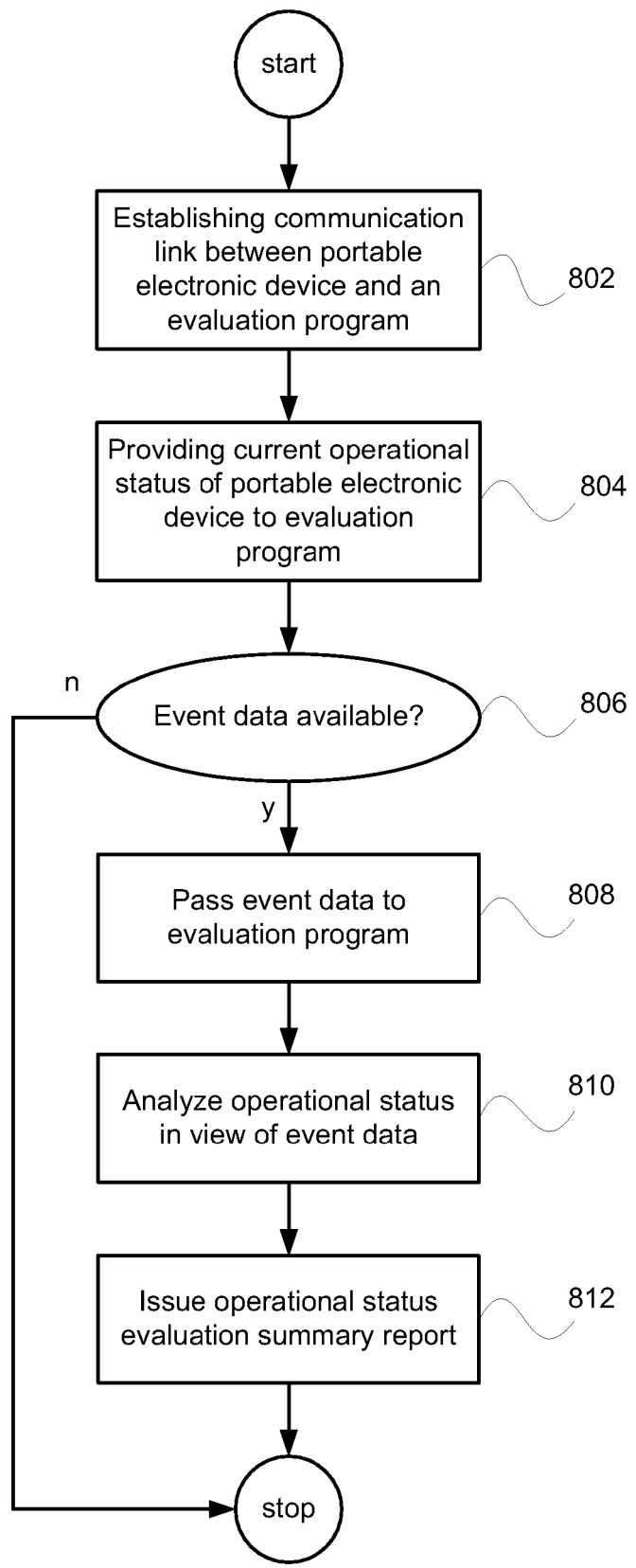
FIG. 8 shows a flowchart detailing a process for evaluating an operational status of a portable electronic device in accordance with an embodiment of the invention.

FIG. 8 illustrates a flowchart detailing a process 800 for evaluating an operational status of a portable electronic device in accordance with an embodiment of the invention. Process 800 begins at 802 establishing a communication link between the portable electronic device and an evaluation program. In the described embodiment, the evaluation program can be executed by a processor included in an external circuit that can be separate and distinct from the portable electronic device. The evaluation program can also be executed by a processing unit that is part of the portable electronic device under evaluation along the lines of a virtual troubleshooting guide. In any case, once the communication link has been established, a current operational status (that can include operational problems, defects, and so on) of the portable electronic device can be provided to the evaluation program at 804. The evaluation program can request a manual entry of the current operational status by, for example, a repair technician, a user, and so on. The evaluation program can also request the portable electronic device automatically provide information over the communication link indicative of the operational status of the portable electronic device. Such operational problems can include the inability of the portable electronic device to power up properly or power up at all, some or all of the components (speakers, display, and so on) are not functioning properly, the battery (if the portable electronic device is battery powered) is not holding a proper charge or not holding a charge for as long as expected, etc.

At 806, a determination can be made if any recorded event data is available. If no recorded event data is available, then processing ends, otherwise, any recorded event data can be passed to the evaluation program at 808. At 810, the evaluation program analyzes the operational status in view of the event data. Analysis of the event data can include pattern analysis, correlation analysis, and evaluation of any warning notices that have been issued and if there is any correlation to any operational problems. At 812, once the evaluation program has completed the analysis, a summary report is issued. The summary report can include information about the operational status of the portable electronic device pointing out likely causes of any problems. In some cases, the summary report can include a probability analysis indicating a probability distribution of likely causes of any operational problems. For example, if the portable electronic device is experiencing short battery life and the event data indicates a history of improper battery charging, then there would be a high probability that the improper battery charging practices is the root cause of the reduced battery life and not a defective battery. In this case, since the likely cause of the reduced battery life stems from the user, a manufacturer can refuse to repair or replace the defective battery under a manufacturer's warranty.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. In a portable electronic device, a method of recording an event, comprising:
    monitoring the portable electronic device for at least one physical occurrence expressed as a parameter having a parameter value;
    designating the physical occurrence as the event when the associated parameter value reaches or exceeds a parameter threshold value; and
    recording event data corresponding to the event,
    if at least some of the recorded event data is improperly recorded, then
    evaluating a current operational status of the portable electronic device using a portion of the properly recorded event data.

2. A method as recited in claim 1, further comprising:
    issuing in real time a notification that the event has been recorded; and
    recording the issuance of the notification as part of the recorded event data.

3. A method as recited in claim 2, further comprising:
    updating an event counter indicating a number of times that a like event has occurred.

4. A method as recited in claim 3, wherein the event data comprises:
    an event type code;
    a date of the event;
    a time of the event;
    a duration of the event; and
    the event counter.

5. A method as recited in claim 3, wherein the issuing the notification comprises:
    communicating at least some of the recorded event data.

6. A method as recited as recited in claim 5, wherein the communicating comprises:
    providing a visual cue and/or an audio cue.

7. A method as recited in claim 1, wherein the evaluating the operational status of the portable electronic device further comprises:
    passing at least some of the recorded event data to an external circuit for further processing that includes at least some of the evaluating; and
    issuing an operational status evaluation report that includes a current operational status of the portable electronic device.

8. A method as recited in claim 7, further comprising:
    if the current operational status requires a repair operation, then
    determining if the repair operation is covered by a manufacturer's warranty or not based upon the evaluation.

9. A method as recited in claim 1, wherein the external circuit is a computing device.

10. A method as recited in claim 9, wherein the computing device is part of a network of computing devices.

11. A method as recited in claim 1, wherein the physical occurrence is selected from a group comprising: exposure to heat and/or cold, impact, stress, user-initiated action, and exposure to moisture.

12. A method as recited in claim 1, further comprising:
    updating the parameter threshold value to an updated parameter threshold value.

13. A portable consumer electronic product, comprising:
    a sensing unit arranged to monitor the consumer electronic product for at least one physical occurrence expressed as a parameter having a parameter value;
    a central processing unit (CPU) coupled to the sensing unit arranged to, at least, receive the parameter value from the sensing unit and designate the physical occurrence as an event when the parameter value reaches or exceeds a parameter threshold value; and
    a recording device coupled to the processor arranged to, at least, record event data corresponding to the event, Wherein if at least some of the recorded event data is improperly recorded, then a current operational status of the portable consumer electronic product is evaluated using a portion of the properly recorded event data.

14. A portable electronic consumer product as recited in claim 13, wherein the CPU issues and records in the recording device as part of the event data, a notification that the event has occurred and has been recorded.

15. A portable electronic consumer product as recited in claim 14, wherein the event data comprises:
   an event type code;
   a date of the event;
   a time of the event;
   a duration of the event; and
   an event counter indicating a number of times that a like event has occurred.

16. A portable electronic consumer product as recited in claim 15, wherein the notification includes at least some of the recorded event data.

17. A portable electronic consumer product as recited as recited in claim 16, wherein the notification takes the form of a visual cue and/or an audio cue.

18. A portable electronic consumer product as recited in claim 13, wherein the portable electronic consumer product further comprises:
   an input/output device coupled to the CPU arranged to pass at least some of the recorded event data to an external circuit for further processing.

19. A portable electronic consumer product as recited in claim 18, wherein as part of the further processing the external circuit issues an operational status evaluation report.

20. A portable electronic consumer product as recited in claim 19, wherein if the current operational status indicates that a repair operation is required, then the external circuit determines if the repair operation is covered by a manufacturer's warranty or not.

21. A portable electronic consumer product as recited in claim 20, wherein the external circuit is a computing device.

22. A portable electronic consumer product as recited in claim 21, wherein the computing device is part of a network of computing devices.

23. A portable electronic consumer product as recited in claim 22, wherein the physical occurrence is selected from a group comprising: exposure to heat and/or cold, impact, stress, user initiated action, and exposure to moisture.

24. A portable electronic consumer product as recited in claim 13, wherein the parameter threshold value is periodically updated.

25. An evaluation unit having a processor for evaluating an operational status of a portable electronic device, comprising:
   computer code for monitoring the portable electronic device for at least one physical occurrence expressed as a parameter having a parameter value;
   computer code for designating the physical occurrence as an event when the associated parameter value reaches or exceeds a parameter threshold value;
   computer code for recording event data corresponding to the event;
   computer code for determining a current operational status of the portable electronic device based upon the recorded event data;
   computer code for determining if the current operational status requires a repair operation;
   computer code for determining if the repair operation is covered by a manufacturer's warranty or not; and
   computer readable medium for storing the computer code.

26. An evaluation unit as recited in claim 25, further comprising:
   computer code for issuing in real time a notification that the event has been recorded; and
   computer code for recording the issuance of the notification as part of the recorded event data.

27. An evaluation unit as recited in claim 26, further comprising:
   computer code for updating an event counter indicating a number of times that a like event has occurred.

28. An evaluation unit as recited in claim 27, wherein the event data comprises:
   an event type code;
   a date of the event;
   a time of the event;
   a duration of the event; and
   the event counter.

29. An evaluation unit as recited in claim 27, wherein the issuing the notification comprises:
   computer code for communicating at least some of the recorded event data.

30. An evaluation unit as recited as recited in claim 29, wherein the communicating comprises:
   computer code for providing a visual cue and/or an audio cue.

31. An evaluation unit as recited in claim 25, further comprising:
   computer code for evaluating the operational status of the portable electronic device based upon the recorded event data
   computer code for determining if at least some of the recorded event data is improperly recorded; and
   computer code for evaluating a current operational status of the portable electronic device using a portion of the properly recorded event data.

32. An evaluation unit as recited in claim 31, further comprising:
   computer code for passing at least some of the recorded event data to an external computing device having a processor arranged to execute computer code for further processing that includes at least some of the evaluating; and
   computer code for issuing a portable electronic device operational status evaluation report based upon the evaluating.

33. An evaluation unit as recited in claim 31, wherein the external circuit is a computing device that is part of a network of computing devices.

34. An evaluation unit as recited in claim 25, wherein the physical occurrence is selected from a group comprising: exposure to heat and/or cold, impact, stress, user initiated action, and exposure to moisture.

35. An evaluation unit as recited in claim 25, further comprising:
   computer code for updating the parameter threshold value to an updated parameter threshold value.

36. A system, comprising:
   a portable electronic consumer product, having at least a sensing unit arranged to monitor the consumer electronic product for at least one physical occurrence expressed as a parameter having a parameter value, a central processing unit (CPU) coupled to the sensing unit arranged to, at least, receive the parameter value from the sensing unit and designate the physical occurrence as an event when the parameter value reaches or exceeds a parameter threshold value, and a recording device coupled to the processor arranged to, at least, record event data corresponding to the event; and
   an external circuit in communication with at least the portable electronic consumer product arranged to evaluate the current operational status based, in part, upon recorded event data received from the recording device, wherein if at least some of the recorded event data is improperly recorded, then a current operational status of the portable electronic consumer product is evaluated using a portion of the properly recorded event data.

37. The system as recited in claim 36, wherein the CPU issues in real time a notification that the event has been recorded, and records the issuance of the notification as part of the recorded event data.

38. The system as recited in claim 37, wherein the CPU updates an event counter indicating a number of times that a like event has occurred.

39. The system as recited in claim 37, the notification includes at least some of the recorded event data.

40. The system as recited in claim 36, wherein the event data comprises:
    an event type code;
    a date of the event;
    a time of the event;
    a duration of the event; and
    the event counter.

41. A system, comprising:
    a portable electronic consumer product having at least a sensing unit arranged to monitor the consumer electronic product for at least one physical occurrence expressed as a parameter having a parameter value, a central processing unit (CPU) coupled to the sensing unit arranged to, at least receive the parameter value from the sensing unit and designate the physical occurrence as an event when the parameter value reaches or exceeds a parameter threshold value, and a recording device coupled to the processor arranged to, at least, record event data corresponding to the event; and
    an external circuit in communication with at least the portable electronic consumer product arranged to
    evaluate the current operational status based, in part, upon recorded event data received from the recording device,
    determine if the current operational status requires a repair operation, and
    determine if the repair operation is covered by a manufacturer's warranty or not.

42. The system as recited in claim 41, wherein the CPU issues in real time a notification if the current operational status requires the repair operation.

43. The system as recited in claim 42, wherein the notification includes the indication if the repair operation is covered by the manufacturer's warranty or not.

* * * * *